(12) United States Patent
Okino et al.

(10) Patent No.: US 8,584,125 B2
(45) Date of Patent: Nov. 12, 2013

(54) APPARATUSES, METHODS, AND COMPUTER-READABLE MEDIA FOR INTERRUPT CONTROL

(75) Inventors: Naoto Okino, Tokyo (JP); Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1677 days.

(21) Appl. No.: 10/580,848

(22) PCT Filed: Sep. 26, 2005

(86) PCT No.: PCT/JP2005/017646
§ 371 (c)(1),
(2), (4) Date: Apr. 5, 2007

(87) PCT Pub. No.: WO2006/035728
PCT Pub. Date: Apr. 6, 2006

(65) Prior Publication Data
US 2008/0046621 A1 Feb. 21, 2008

(30) Foreign Application Priority Data
Sep. 29, 2004 (JP) .................................. 2004-283529

(51) Int. Cl.
*G06F 9/46* (2006.01)
(52) U.S. Cl.
USPC .......................................................... 718/102
(58) Field of Classification Search
None
See application file for complete search history.

(56) References Cited

U.S. PATENT DOCUMENTS

| | | | |
|---|---|---|---|
| 4,674,038 A * | 6/1987 | Brelsford et al. | 714/15 |
| 5,276,815 A | 1/1994 | Nakashima et al. | |
| 5,499,379 A * | 3/1996 | Tanaka et al. | 710/40 |
| 5,805,790 A | 9/1998 | Nota et al. | |
| 6,633,942 B1 * | 10/2003 | Balasubramanian | 710/264 |
| 2004/0215860 A1 | 10/2004 | Armstrong et al. | |
| 2004/0230794 A1 * | 11/2004 | England et al. | 713/164 |
| 2005/0039181 A1 | 2/2005 | Togawa | |

FOREIGN PATENT DOCUMENTS

| | | |
|---|---|---|
| JP | 2-239334 | 9/1990 |
| JP | 6-250850 | 9/1994 |
| JP | 8-241209 | 9/1996 |
| JP | 8-263454 | 10/1996 |
| JP | 2003-345612 | 12/2003 |
| JP | 2004-326743 | 11/2004 |
| WO | WO 02/50664 | 6/2002 |

OTHER PUBLICATIONS

Magenheimer, Daniel J., et al, "vBlades: Optimized Paravirtualization for the Itanium Processor Family", May 6-7, 2004.*

* cited by examiner

*Primary Examiner* — Gregory A Kessler
(74) *Attorney, Agent, or Firm* — Finnegan, Henderson, Farabow, Garrett & Dunner, LLP

(57) ABSTRACT

An improved interrupt control mechanism is provided in a system in which a plurality of OS's (OS's) are concurrently operating. In the system, a main OS executing an interrupt control process is set up, sub OS's other than the main OS are not provided with a right to determine an interrupt mask, the sub OS notifies the main OS whether the sub OS is in an interrupt enabled state or an interrupt disabled state, and the main OS performs an interrupt mask control process based on the notified information. In this arrangement, an inconvenience that an interrupt process is reserved due to a mask control performed by the sub OS itself is corrected, the main OS can perform the interrupt control as the main OS intends, and a required interrupt process can be performed with priority. Memory area is saved because a vector area of the sub OS is managed by the main OS.

13 Claims, 11 Drawing Sheets

FIG. 6

| OS TYPE | INTERRUPT ENABLED STATE OR INTERRUPT DISABLED STATE | RESERVE INTERRUPT | PROCESS INTERRUPT |
|---|---|---|---|
| MAIN OS | DISABLED | — | — |
| SUB OS-1 | ENABLED | — | INTERRUPT e |
| SUB OS-2 | DISABLED | INTERRUPT a<br>INTERRUPT b | — |
| . . | . . | . . | . . |
| SUB OS-n | DISABLED | INTERRUPT c<br>INTERRUPT d | — |

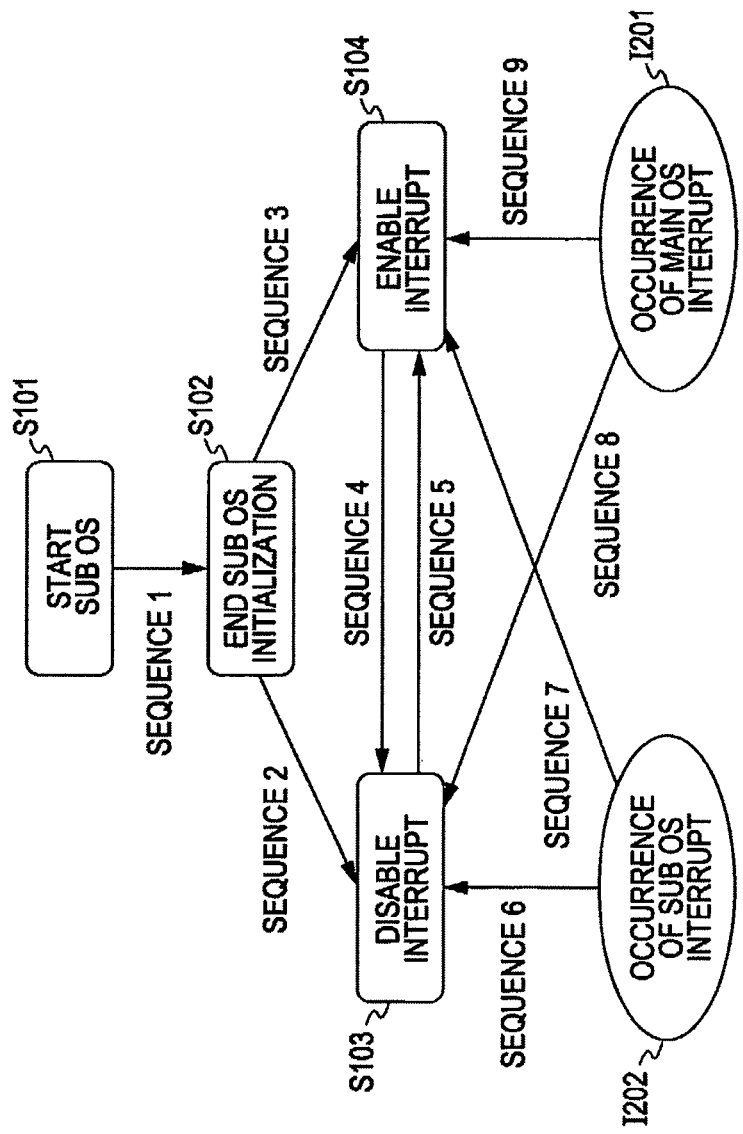

FIG. 8

| SCENARIO | OS IN OPERATION | INTERRUPT PRIORITY | INTERRUPT DESTINATION OS | INTERRUPT ENABLED/DISABLED STATE OF INTERRUPT DESTINATION OS |
|---|---|---|---|---|
| SCENARIO 01 | SUB OS | LOW | MAIN OS | INTERRUPT ENABLED |
| SCENARIO 02 | SUB OS | LOW | MAIN OS | INTERRUPT DISABLED |
| SCENARIO 03 | SUB OS | LOW | SUB OS | INTERRUPT ENABLED |
| SCENARIO 04 | SUB OS | LOW | SUB OS | INTERRUPT DISABLED |
| SCENARIO 05 | SUB OS | HIGH | MAIN OS | INTERRUPT ENABLED |
| SCENARIO 06 | SUB OS | HIGH | MAIN OS | INTERRUPT DISABLED |
| SCENARIO 07 | SUB OS | HIGH | SUB OS | INTERRUPT ENABLED |
| SCENARIO 08 | SUB OS | HIGH | SUB OS | INTERRUPT DISABLED |
| SCENARIO 09 | MAIN OS | LOW | MAIN OS | INTERRUPT ENABLED |
| SCENARIO 10 | MAIN OS | LOW | MAIN OS | INTERRUPT DISABLED |
| SCENARIO 11 | MAIN OS | LOW | SUB OS | INTERRUPT ENABLED |
| SCENARIO 12 | MAIN OS | LOW | SUB OS | INTERRUPT DISABLED |
| SCENARIO 13 | MAIN OS | HIGH | MAIN OS | INTERRUPT ENABLED |
| SCENARIO 14 | MAIN OS | HIGH | MAIN OS | INTERRUPT DISABLED |
| SCENARIO 15 | MAIN OS | HIGH | SUB OS | INTERRUPT ENABLED |
| SCENARIO 16 | MAIN OS | HIGH | SUB OS | INTERRUPT DISABLED |

APPARATUSES, METHODS, AND COMPUTER-READABLE MEDIA FOR INTERRUPT CONTROL

TECHNICAL FIELD

The present invention relates to an information processing apparatus, an interrupt process control method, and a computer program. More specifically, the present invention relates to an information processing apparatus, an interrupt control method, and a computer program for setting a main operating system (OS) for controlling an interrupt process in a system including a plurality of OSs in order to decrease interrupt mask time of the entire system, improve interrupt response, and achieve efficient data processing.

BACKGROUND ART

In a multi-operating system (OS) having a plurality of OSs in a single system, each OS can execute respective processes on hardware common to the system, such as a central processing unit (CPU) and a memory, successively switched in time sequences.

Scheduling of processes (tasks) of a plurality of OSs is executed by a partition management software program, for example. If an OS($\alpha$) and an OS($\beta$) coexist in a single system with the process of OS($\alpha$) being a partition A and the process of OS($\beta$) being a partition B, the partition management software program determines the scheduling of the partition A and the partition B, and executes the process of the OSs with the hardware resources allocated based on the determined scheduling.

Patent Document 1 discloses a task management technique of a multi-OS system. According to the disclosure, tasks to be executed by a plurality of OSs are scheduled with a priority placed on a process having urgency.

An entity processing data is set up as a partition. More specifically, a logical partition is set up as an entity that shares resources in a system. A variety of resources such as use time of the physical processor, virtual address space, and memory space are allocated to the logical partition. The process is then performed using the allocated resources. A logical processor corresponding to any physical processor is set up in the logical partition, and data processing is performed based on the logical processor. The logical processor does not always correspond to the physical processor on a one-to-one correspondence. For example, a single logical processor can correspond to a plurality of physical processors, and a plurality of logical processors can correspond to a single physical processor.

If a plurality of processes are performed in parallel using the logical processor, the physical processor is used by scheduling the plurality of logical processors. More specifically, the plurality of logical processors uses the physical processor in a time-sharing manner.

In the multi-OS, hardware resources such as physically available processors are limited. A physical processor, currently used by one OS, cannot be used by another OS. A duration throughout which the processor cannot be used by another OS is referred to as an interrupt mask period. As the interrupt mask period is prolonged, the efficiency of the entire system is decreased.

[Patent Document 1] Japanese Unexamined Patent Application Publication No. 2003-345612

DISCLOSURE OF INVENTION

Problems to be Solved by the Invention

It is thus desirable to provide an information processing apparatus, an interrupt control method, and a computer program for setting a main OS for controlling an interrupt process in a system including a plurality of OSs in order to decrease interrupt mask time of the entire system, improve interrupt response, and achieve efficient data processing.

Means for Solving the Problems

In accordance with one aspect of the present invention, an information processing apparatus processes data for a plurality of OSs. The plurality of OSs includes a main OS controlling an interrupt process and a sub OS. The main OS stores status information as to whether the sub OS is in an interrupt-enabled state or an interrupt-disabled state, and controls the interrupt process to perform one of an interrupt process execution and an interrupt process reserve in response to the generation of the interrupt based on the status information.

In the information processing apparatus of one embodiment of the present invention, the main OS stores interrupt process status information as to whether the interrupt process is in progress or in reserve, and resumes the interrupt process execution in response to the transition of the sub OS between the interrupt-enabled state and the interrupt-disabled state.

In the information processing apparatus of one embodiment of the present invention, the sub OS notifies the main OS of the status information as to whether the sub OS is in the interrupt-enabled state or the interrupt-disabled state, and the main OS updates the status information of the sub OS in response to the notification from the sub OS.

In the information processing apparatus of one embodiment of the present invention, the main OS stores priority information of the interrupt process, and performs the interrupt process responsive to the priority information.

In the information processing apparatus of one embodiment of the present invention, the main OS performs status management based on a status table containing the status information of the sub OS and the interrupt process status information as to whether the interrupt process is in progress or in reserve. If an interrupt intended for the sub OS is generated and the main OS determines based on the status table that the sub OS is in the interrupt-disabled state, the main OS registers the interrupt in the status table as a reserved interrupt. If an interrupt intended for the sub OS is generated and the main OS determines based on the status table that the sub OS is in the interrupt-enabled state, the main OS performs interrupt control depending on whether the OS operating on a processor is either the main OS or the sub OS in a manner such that (a) if the main OS is in operation, the main OS (a1) executes the interrupt process in response to a high-priority interrupt, or (a2) reserves the interrupt process in response to a low-priority interrupt, and that (b) if the sub OS is in operation, the sub OS executes the interrupt process regardless of the priority level of the interrupt.

In the information processing apparatus of one embodiment of the present invention, the main OS performs status management based on a status table containing the status information of the sub OS and the interrupt process status information as to whether the interrupt process is in progress or in reserve. If an interrupt intended for the main OS is generated, the main OS performs interrupt control depending on whether the OS operating on a processor is either the main OS or the sub OS in a manner such that (a) if the main OS is in operation, the main OS executes the interrupt process regardless of the priority level of the interrupt, and that (b) if the sub OS is in operation, the sub OS (b1) executes the interrupt process in response to a high-priority interrupt, or (b2) reserves the interrupt process in response to a low-priority interrupt.

In accordance with a second aspect of the present invention, an interrupt process control method for performing data processing on a plurality of OSs, includes steps of receiving, from a sub OS other than a main OS, status information as to whether the sub OS is in an interrupt-enabled state or an interrupt-disabled state, detecting the generation of an interrupt, and controlling an interrupt process to perform one of an interrupt process execution and an interrupt process reserve, in response to the generation of the interrupt based on the status information.

In the interrupt process control method of one embodiment of the present invention, the main OS stores interrupt process status information as to whether the interrupt process is in progress or in reserve, and resumes the interrupt process execution in response to the transition of the sub OS between the interrupt-enabled state and the interrupt-disabled state.

The interrupt process control method of one embodiment of the present invention may further include steps of notifying the main OS of the status information as to whether the sub OS is in the interrupt-enabled state or the interrupt-disabled state, and updating the status information of the sub OS in response to the notification from the sub OS.

In the interrupt process control method of one embodiment of the present invention, the main OS stores priority information of the interrupt process, and performs the interrupt process responsive to the priority information.

In the interrupt process control method of one embodiment of the present invention, the main OS performs status management based on a status table containing the status information of the sub OS and the interrupt process status information as to whether the interrupt process is in progress or in reserve. If an interrupt intended for the sub OS is generated and the main OS determines based on the status table that the sub OS is in the interrupt-disabled state, the main OS registers the interrupt in the status table as a reserved interrupt. If an interrupt intended for the sub OS is generated and the main OS determines based on the status table that the sub OS is in the interrupt-enabled state, the main OS performs interrupt control depending on whether the OS operating on a processor is either the main OS or the sub OS in a manner such that (a) if the main OS is in operation, the main OS (a1) executes the interrupt process in response to a high priority interrupt, or (a2) reserves the interrupt process in response to a low priority interrupt, and that (b) if the sub OS is in operation, the sub OS executes the interrupt process regardless of the priority level of the interrupt.

In the interrupt process control method of one embodiment of the present invention, the main OS performs status management based on a status table containing the status information of the sub OS and the interrupt process status information as to whether the interrupt process is in progress or in reserve. If an interrupt intended for the main OS is generated, the main OS performs interrupt control depending on whether the OS operating on a processor is either the main OS or the sub OS in a manner such that (a) if the main OS is in operation, the main OS executes the interrupt process regardless of the priority level of the interrupt, and that (b) if the sub OS is in operation, the sub OS (b1) executes the interrupt process in response to a high priority interrupt, or (b2) reserves the interrupt process in response to a low priority interrupt.

In accordance with a third aspect of the present invention, a computer program for performing an interrupt process control in data processing on a plurality of OSs, includes steps of receiving, from a sub OS other than a main OS, status information as to whether the sub OS is in an interrupt-enabled state or an interrupt-disabled state, detecting the generation of an interrupt, and controlling an interrupt process to perform one of an interrupt process execution and an interrupt process reserve, in response to the generation of the interrupt based on the status information.

The computer program of one embodiment of the present invention is provided, to a general-purpose computer system executing a variety of program code, in a computer-readable storage medium, such as a CO, an FO, or an MO, or a communication medium such as network. By providing the computer program in a computer readable manner, the computer system performs processes responsive to the computer program.

These and other features, and advantages of the present invention will become obvious from the following description of the present invention and the accompanying drawings. In the context of the description of the present invention, the system refers to a logical set of a plurality of apparatuses, and is not limited to an apparatus that houses elements within the same casing.

Advantages

In accordance with embodiments of the present invention, the main OS executing the interrupt process is set in the system in which a plurality of OSs concurrently run. With the main OS performing interrupt control processes, the mask time of the entire system is reduced, interrupt response is improved, and data processing is efficiently performed.

In accordance with embodiments of the present invention, the main OS executing the interrupt process control is set, and the right to set an interrupt mask is not handed over to a sub OS other than the main OS. The sub OS notifies the main OS whether the sub OS is in the interrupt-enabled state or the interrupt-disabled state. The main OS controls an interrupt mask of the sub OS. This arrangement prevents the sub OS from reserving a required interrupt process due to its own mask control. In accordance with the intention of the main OS, all interrupt processes are controlled. Required interrupt processes are thus performed with priority.

In accordance with embodiments of the present invention, a sub OS interrupt vector management unit is set in the main OS. The main OS generally manages an interrupt vector area of the sub OS. Unlike interrupt vector management individually performed by OSs, the interrupt vector is shared, and memory area is saved.

BRIEF DESCRIPTION OF THE DRAWINGS

FIG. 6 illustrates a status table listing OS status information and interrupt process status information managed by the main OS in one embodiment of the present invention.

FIG. 7 illustrates the status of the sub OS and a process sequence responsive to the generation of an interrupt.

FIG. 8 illustrates a list of relationships of OSs executing a process using a processor (OSs in operation), priority level of the interrupt (high and low priority levels), an interrupt destination OS, and an interrupt grant state of the interrupt destination OS.

BEST MODE FOR CARRYING OUT THE INVENTION

An information processing apparatus, an interrupt process control method, and a computer program in accordance with embodiments of the present invention are described below with reference to the drawings.

Figure 1:
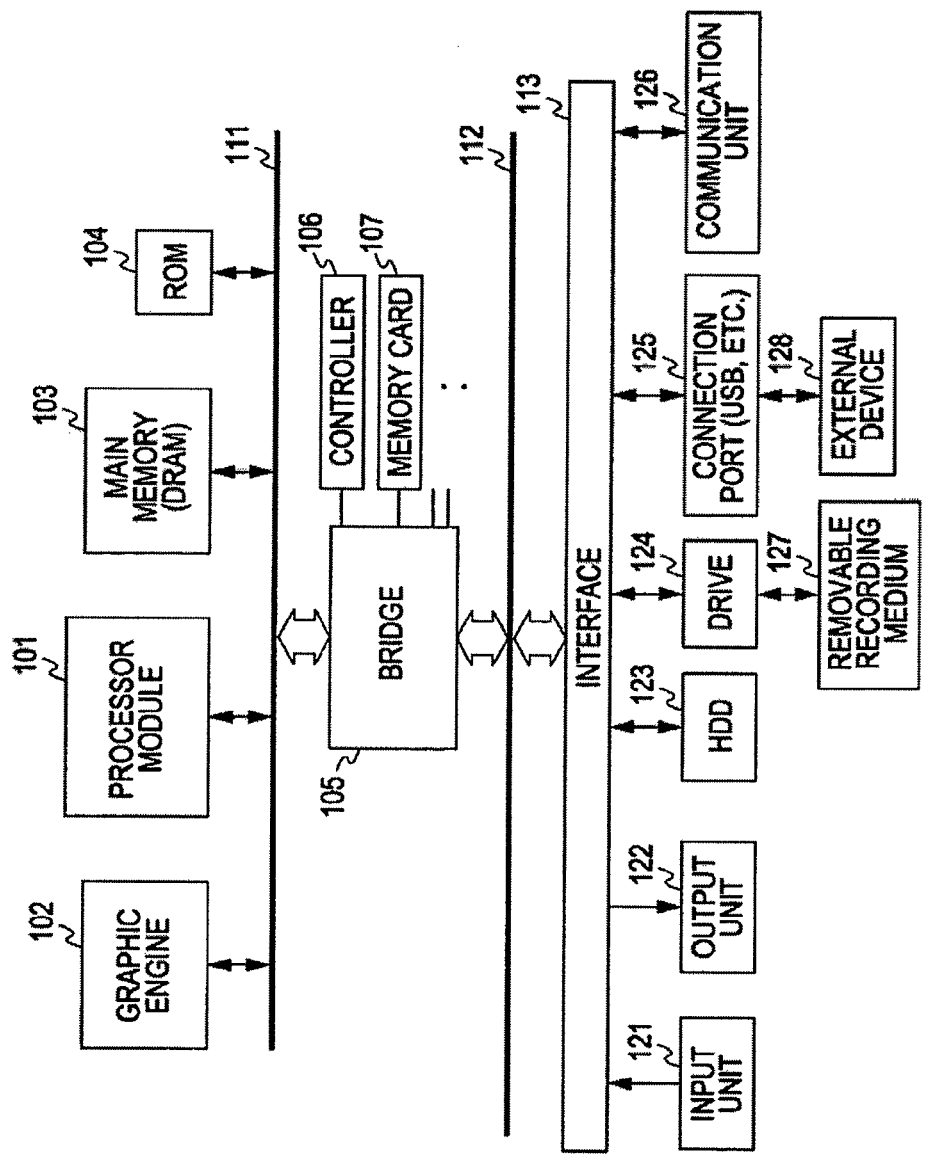
FIG. 1 is a block diagram illustrating an information processing apparatus of one embodiment of the present invention.

The hardware structure of the information processing apparatus of one embodiment of the present invention is described below with reference to FIG. 1. A processor module 101 includes a plurality of processing units, and processes data in accordance with a variety of programs stored in a read-only memory (ROM) 104 and an HOD 123, including operating systems (OSs) and application programs running on the OSs. The processor module 101 will be described later with reference to FIG. 2.

In response to a command input via the processor module 101, a graphic engine 102 generates data to be displayed on a screen of a display forming an output unit 122, and performs, for example, a 3D graphic drawing process. A main memory (DRAM) 103 stores the program executed by the processor module 101 and parameters that vary in the course of execution of the program. These elements are interconnected via a host bus III including a CPU bus.

The host bus 111 is connected to an external bus 112, such as a PCI (peripheral component interconnect/interface) bus via a bridge 105. The bridge 105 controls data inputting and outputting between the host bus 111, the external bus 112, a controller 106, a memory card 107, and other devices.

An input unit 121 inputs information to an input device, such as a keyboard and a pointing device, operated by a user. An output unit 122 includes an image output unit, such as one of a liquid-crystal display and a CRT (cathode ray tube), and an audio output device such as a loudspeaker.

The HDD (hard disk drive) 123 drives a hard disk loaded therewithin, thereby recording or playing back a program to be executed by the processor module 101 and information.

A drive 124 reads data and programs stored in a loaded removable recording medium 127, such as a magnetic disk, an optical disk, a magneto-optic disk, a semiconductor memory, or the like, and supplies the data and the programs to a main memory (DRAM) 103 via an interface 113, the external bus 112, the bridge 105, and the host bus 111.

A connection port 125 connects to an external device 128, and may include a USB, an IEEE 1394 bus, or the like. The connection port 125 is connected to the processor module 101 via the interface 113, the external bus 112, the bridge 105, and the host bus 111. A communication unit 126, connected to a network, transmits data supplied from the HDD 123 or the like, and receives data from the outside.

The structure of the processor module is described below with reference to FIG. 2. As shown, a processor module 200 includes a main processor group 201 including a plurality of main processor units, and a plurality of sub-processor groups 202-20n, each including a plurality of sub-processor units. Each group further includes a memory controller and a secondary cache. The processor groups 201-20n, each including eight processor units, for example, are connected via one of a cross-bar architecture and a packet exchange network. In response to a command of the main processor of the main processor group 201, at least one sub-processor in the plurality of sub-processor groups 202-20n is selected to perform a predetermined program.

The structure of the processor module is described. The memory-flow controller in each processor group controls data inputting and data outputting to the main memory 103 of FIG. 1. The secondary cache serves as a memory area for processing data in each processor group.

The operating systems (OSs) of the information processing apparatus of one embodiment of the present invention are described below with reference to FIG. 3. The multi-OS information processing apparatus has a plurality of OSs arranged in a logical layered structure as shown in FIG. 3.

Figure 2:
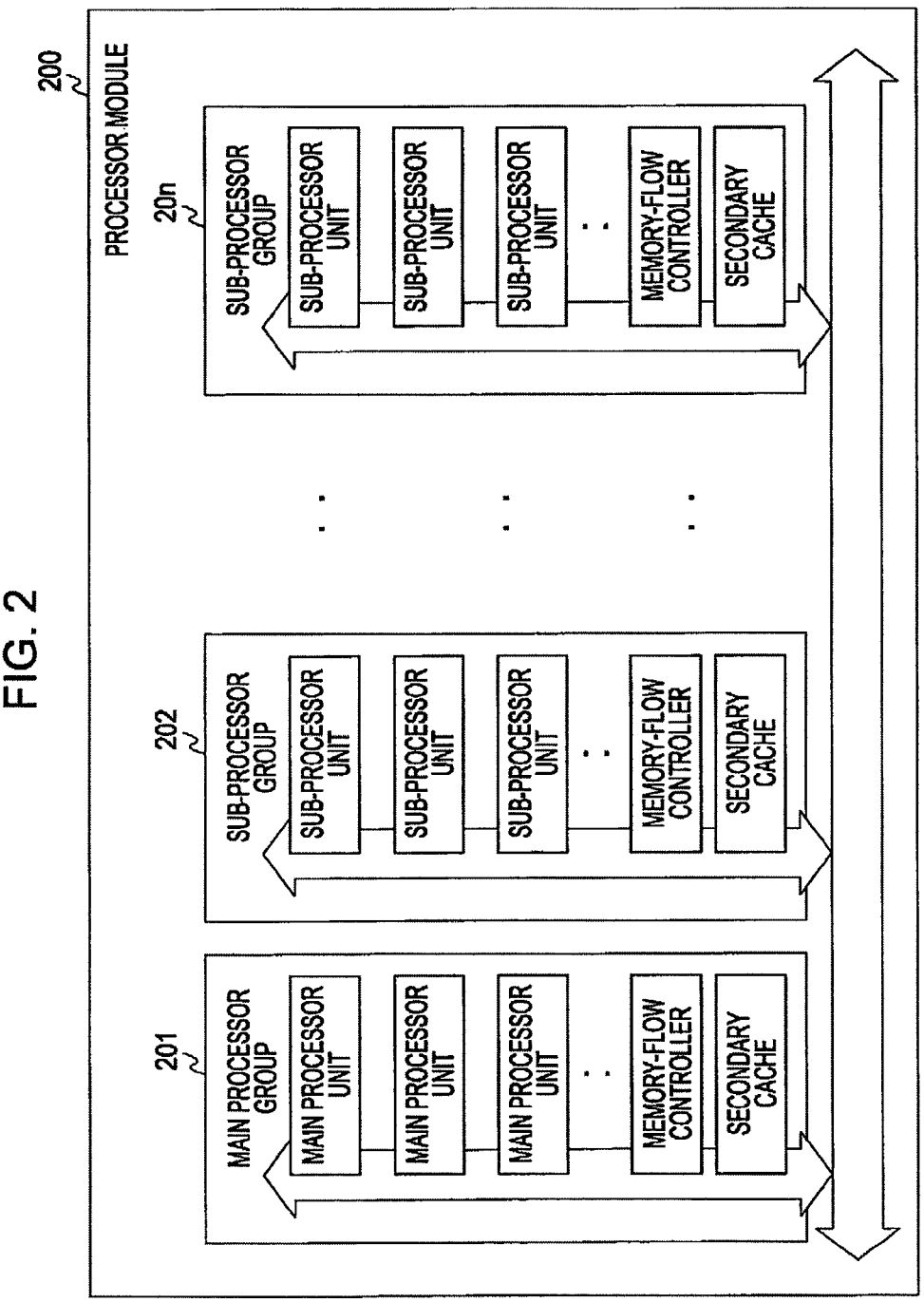
FIG. 2 illustrates the structure of a processor module.
Figure 3:
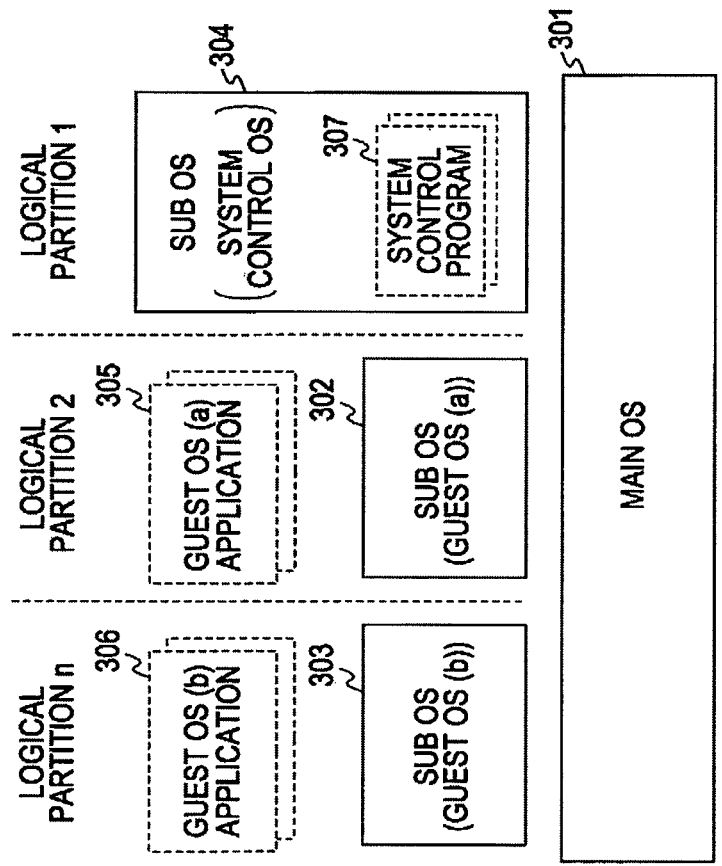
FIG. 3 illustrates operating systems of the information processing apparatus in accordance with one embodiment of the present invention.

As shown in FIG. 3, a main OS 301 is arranged at a lower layer. A plurality of sub OSs 302, 303, and 304 are arranged at upper layers. Guest sub OSs 302 and 303 and a sub system control OS 304 are set as sub OSs. Together with the system control OS 304, the main OS 301 forms a logical partition as an execution unit of each process executed by the processor module 101 discussed with reference to FIGS. 1 and 2, and allocates system hardware resources (for example, main processors, sub-processors, memories, and devices, as computing resources) to each logical partition.

The guest OSs 302 and 303 as the sub OSs are a gaming OS, Windows®, Linux®, etc, and operate under the control of the main OS 301. Although only two guest OSs 302 and 303 are shown in FIG. 3, the number of guest OSs is not limited to two.

The guest OSs 302 and 303 operate within the logical partitions set by the main OS 301 and the system control OS 304. The guest OSs 302 and 303 process a variety of data using hardware resources such as main processors, sub-processors, memories, and devices, each allocated to the logical partition.

The guest OS(a) 302 uses the hardware devices including a main processor, a sub-processor, a memory, and a device allocated to the logical partition 2 set up by the control OS 301 and the system control OS 304, thereby executing an application program 305 corresponding to the guest OS(a) 302. The guest OS(b) 303 uses the hardware resources including a main processor, a sub-processor, a memory, and a device allocated to a logical partition "n", thereby executing an application program 306 corresponding to the guest OS(b) 303. The main OS 301 provides a guest OS programming interface required to execute the guest OS.

The system control as 304 as one of the sub OSs generates a system control program 307 containing a logical partition management program, and performs operation control responsive to the system control program 307 together with the main OS 301. The system control program 307 controls system policy using a system control program programming interface. The application program 306 is supplied with the system control program programming interface by the control OS 301. For example, the system control program 307 permits flexible customization, for example, setting an upper limit on resource allocation.

The system control program 307 controls the behavior of the system using the system control program programming interface. For example, the system control program 307 produces a new logical partition, and starts up a new guest OS at the logical partition. In a system where a plurality of guest OSs are operating, the guest OSs are initiated in the order programmed in the system control program 307. The system control program 307 can receive and examine a resource allocation request issued from the guest OS before being received by the main OS 301, modify the system policy, and deny the request itself. In this way, no particular guest OS monopolizes the resources. A program into which the system policy is implemented is the system control program.

The main OS 301 allocates a particular logical partition (for example, the logical partition 1) to the system control OS 304. The main OS 301 operates in a hypervisor mode. The guest OS operates in a supervisor mode. The system control OS 304 and the application program operate in a problem mode (user mode).

The logical partition is an entity receiving a resource allocation in the system. For example, the main memory 103 is partitioned into several areas (see FIG. 1), and each logical partition is granted the right to use the respective area. The types of resources allocated to the logical partitions are listed below.

a) Physical processor unit usage time
 b) Virtual address space
 c) Memory accessible by program operating in a logical partition
 d) Memory used by the control OS to manage the logical partition
 e) Event port
 f) Right to use device
 g) Cache partition
 h) Right to use bus As previously discussed, each OS operates within the logical partition. The OS monopolizes the resources allocated to the logical partition to process a variety of data. In many cases, one partition is produced for a guest OS, on a per guest OS basis, functioning on the system. Each logical partition is assigned a unique identifier. The system control OS 304 manages the system control program generated as logical partition management information by associating the system control program to the identifier.

The logical partition is generated by the main OS 301 and the system control OS 304. Immediately after production, the logical partition has no resources, and with no limitation set on available resources. The logical partition takes one of two states, an active state and an end state. The logical partition immediately after production takes an active state. The logical partition is transitioned into the end state in response to a request of a guest OS operating in the logical partition, and stops all logical processors allocated to the logical partition.

The logical processor is the one allocated to the logical partition, and corresponds to any physical processor, namely, a processor within a processor group of FIG. 2. The logical processor and the physical processor are not always related to each other in one-to-one correspondence. A single logical processor can correspond to a plurality of physical processors. Alternatively, a plurality of logical processors can correspond to a single physical processor. The correspondence between the logical processor and the physical processor is determined by the main OS 301.

The main OS 301 has a function to limit the amount of resources available to each logical partition. Limitation can be set to the amount of use of resources the guest OS 302 and the guest OS 303 can allocate and release without communicating with the system control OS 304.

The main OS provides the logical partition with a logical sub-processor in an abstract form of a physical sub-processor (as a computing resource). As previously discussed, the physical sub-processor is not related to the logical sub-processor in one-to-one correspondence, and it is not a requirement that the physical sub-processors be identical in number to the logical sub-processors. As necessary, the control OS can thus cause a single physical sub-processor to correspond to a plurality of logical sub-processors.

If the number of the logical sub-processors is larger than the number of physical sub-processors, the control OS uses the physical sub-processors in a time sharing manner. The logical sub-processor can repeatedly stop and then resume operation. The sub OS can monitor such changes.

An entity processing data is set up as a partition. More specifically, a logical partition is set up as an entity that shares resources in a system. A variety of resources such as use time of the physical processor, virtual address space, and memory space are allocated to the logical partition. The process is then performed using the allocated resources. A logical processor corresponding to any physical processor is set up in the logical partition, and data processing is performed based on the logical processor. The logical processor does not always correspond to the physical processor on a one-to-one correspondence basis. For example, a single logical processor can correspond to a plurality of physical processors, and a plurality of logical processors can correspond to a single physical processor.

If a plurality of processes are performed in parallel using the logical processor, the physical processor is scheduled by the plurality of logical processors. More specifically, the plurality of logical processors uses the physical processor in a time sharing manner.

Figure 4:
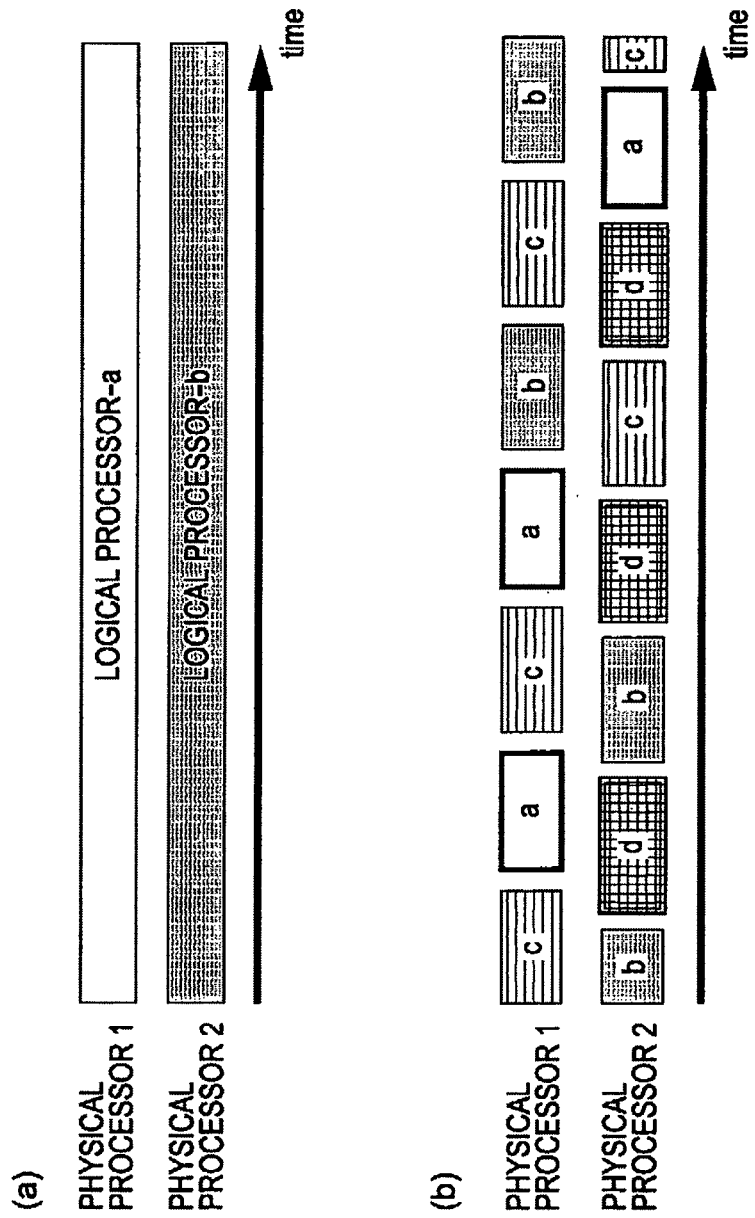
FIG. 4 illustrates an allocation process of allocating a logical processor to a physical processor in a time sharing manner.

Referring to FIG. 4, how to use the physical processor in a time sharing manner is discussed. As shown in FIG. 4(a), a single logical processor corresponding to one of the main OS and the sub OS is allocated to a single physical processor. A logical processor (a) monopolizes a physical processor (1), and a logical processor (b) monopolizes a physical processor 2.

As shown in FIG. 4(b), a plurality of logical processors, assigned to a single physical processor, perform processes in a time sharing manner. The physical processor 1 is shared in time in the order of the logical processors c→a→c→a→b→c→b. Each logical processor corresponding to the process of one of the main OS and the sub OS is performed. The physical processor 2 is shared in time in the order of the logical processors b→d→b→d→c→d→a. Each logical processor corresponding to the process of one of the main OS and the sub OS is performed.

The information processing apparatus of one embodiment of the present invention is a multi-OS system using a plurality of OSs. As previously discussed with reference to FIG. 3, the plurality of OSs are divided into a single main OS and remaining sub OSs. The function and interrupt process control of the main OS and the sub OSs of the information processing apparatus of one embodiment of the present invention are described below.

In the interrupt process, a device such as an input and output device or a system clock, interrupts asynchronously a CPU. To accept an interrupt and perform an interrupt process, the CPU as a physical processor suspends a current process in the middle thereof, performs the interrupt process, and then resume the original process after completion of the interrupt process. In the interrupt process, hardware status information corresponding to the reserved process is produced as a context table, and stored in memory as necessary. Subsequent to the completion of the interrupt process, the CPU restores hardware state by recovering context, and resumes the process from reserve.

The functions of in the interrupt process control of the main OS and the sub OS are listed as follows:

(1) The main OS manages competing resources such as setting an interrupt mask and interrupt vector.

(2) The main OS records status information of OSs processing data, including the main OS.

(3) Instead of directly controlling an interrupt mask register, the sub OS notifies the main OS whether the sub OS is in an interrupt-enabled state or an interrupt-disabled state.

(4) The main OS receives all interrupt requests, and transfers a required interrupt only when the sub OS is interruptable and operative.

With these functions, (1) all interrupt masks are emptied for a period throughout which all interrupts are masked from the sub OS.

(2) Since the interrupt vector is shared, an integrated image of the main OS and the sub OS is produced to reduce used memory.

Figure 5:
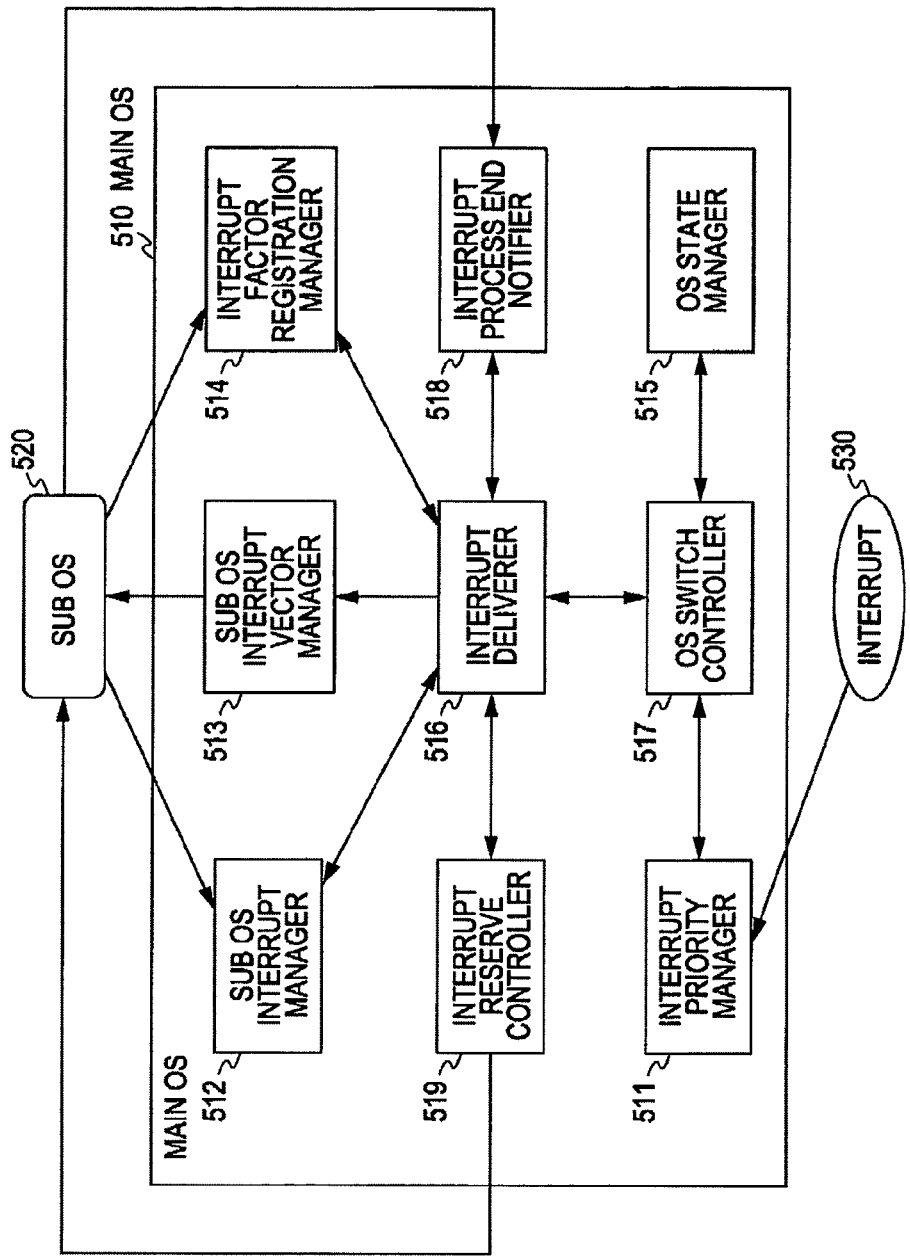
FIG. 5 is a functional diagram illustrating a main OS of the information processing apparatus in accordance with one embodiment of the present invention.

The functions of the main OS are described below with reference to FIG. 5. FIG. 5 is a block diagram illustrating the function of a main OS 510 in the interrupt process control.

The main OS 510 includes an interrupt priority manager 511, a sub OS interrupt manager 512, a sub OS interrupt vector manager 513, an interrupt factor registration manager 514, an executing OS state manager 515, an interrupt deliverer 516, an executing OS switch controller 517, an interrupt process end notifier 518, and an interrupt reserve controller 519. The process of each element is described below.

The interrupt priority manager 511 performs interrupt management based on the priority corresponding to an interrupt factor. The interrupt processes include an interrupt process intended for the main OS and an interrupt process intended for the sub OS, and each interrupt is prioritized. In the prioritization, each interrupt process is prioritized with a two-level priority of low level and high level, or three-level or more multi-level priority. The interrupt priority manager 511 determines a process corresponding to an interrupt 530 caused in accordance with the priority set in response to the interrupt factor.

The sub OS interrupt manager 512 manages the interrupt-enabled state and the interrupt-disabled state of the sub OS. As previously discussed, the main OS 510 is notified by the sub OS 520 whether the sub OS is in the interrupt-enabled state or the interrupt-disabled state. In response to the notification from the sub OS 520, the sub OS interrupt manager 512 in the main OS 510 stores management information as to whether each sub OS is in the interrupt-enabled state or the interrupt-disabled state.

The sub OS interrupt manager 512 registers the state of each sub OS onto a status table listing the state as to whether each sub OS is in the interrupt-enabled state or the interrupt-disabled state. For example, the status table contains an interrupt mask register that stores the interrupt-enabled state as (0) and the interrupt-disabled state as (1). The sub OS interrupt manager 512 manages the state of each sub OS based on the interrupt mask register. If an interrupt request occurs with the sub OS in the interrupt-disabled state, namely, in a masked state, the interrupt request must wait. With the sub OS in the interrupt-enabled state, namely, in a mask released state, the interrupt process responsive to the interrupt request is permitted.

FIG. 5 illustrates a single sub OS 520. As previously discussed with reference to FIG. 3, the information processing apparatus can accommodate a plurality of sub OSs. The sub OS interrupt manager 512 in the main OS 510 stores the management information of each of the sub OSs as to whether the sub OS is in the interrupt-enabled state or the interrupt-disabled state, and performs interrupt process control in response to the state of each sub OS.

FIG. 6 illustrates the status table stored as the management information of the sub OS interrupt manager 512. As shown in FIG. 6, the status table lists, in a related form, data of the state of each OS, namely, the status information as to whether the sub OS is in the interrupt-enabled state or the interrupt-disabled state, information relating to a reserved interrupt, and information relating to the interrupt process in progress. Upon receiving the status notification from each sub OS, the sub OS interrupt manager 512 updates the status table in response to the received information. In response to the occurrence, reserve, delivery, and completion of an interrupt process, the sub OS interrupt manager 512 registers in the status table the status as to whether each interrupt is reserved or in progress. The sub OS interrupt manager 512 deletes an interrupt from the status table if the corresponding interrupt process has been completed.

The sub OS interrupt vector manager 513 manages an interrupt vector area in each sub OS. The interrupt vector is a memory area table defined by the interrupt factor, and is composed of a start address of an interrupt process routine. A processor receiving an interrupt examines the address of an interrupt handler from the memory area, and jumps to the address to start the interrupt process. The sub OS interrupt vector manager 513 manages the interrupt vector area of the sub OS.

The interrupt factor registration manager 514 stores and manages registration information of the interrupt factor intended for the main OS and the interrupt factor intended for the sub OS. The interrupt factors of the main OS and the sub OS can be modified by an I/O device used by the OS. The interrupt factor registration manager 514 registers and deletes the interrupt factors to each OS. The interrupt factors include an interrupt process from an input unit, such as a keyboard or a mouse, and data input from a network interface.

The executing OS state manager 515 records and manages information of an OS executing data processing on the physical processor.

The interrupt deliverer 516 performs an interrupt delivery process, namely, determines which processor or processor group is to be notified of each interrupt request to perform the corresponding interrupt process.

The executing OS switch controller 517 controls switching a variety of data processing (including tasks) to be performed by the processor. As previously discussed, the logical processors are allocated to the physical processor. At least one processor is shared in time by the OSs to process data. The OS switch controller 517 switches the OSs in accordance with the processor use scheduling of the OSs.

The interrupt process end notifier 518 monitors execution status of the interrupt process in response to the interrupt request, and notifies the OS, having executed the process suspended by the interrupt process, of the end of the interrupt process. When the interrupt process is completed, the context corresponding to the suspended process is restored, the hardware state of the suspended process is restored, and then the original process resumes.

The interrupt reserve controller 519 performs an interrupt reserve control process. As previously discussed, the interrupt request occurring in the interrupt-disabled state, namely, in the masked state must wait until masking is released. The interrupt reserve controller 519 manages a reserved interrupt on standby state. The interrupt reserve controller 519 updates the status table having interrupt reserve information set therewithin and notifies the sub OS 520 of the reserved interrupt if the reserved interrupt is registered in the status table.

The interrupt process control and state transition performed by the main OS in response to the two states of the sub OS, namely, the "interrupt-enabled state" and the "interrupt-disabled state", is described below with reference to FIG. 7.

As shown in FIG. 7, steps S101-S104 show fours states of a single sub OS in the information processing apparatus as follows:
State S101: the sub OS starts.
State S102: the sub OS is initialized.
State S103: the sub OS is set to be in the interrupt-disabled state.
State S104: the sub OS is set to be in the interrupt-enabled state.
With the sub OS being in one of:
state S103: interrupt-disabled state and
state S104: interrupt-enabled state, one of the following events occurs:
event I201: interrupt to the main OS, or
event I202: interrupt to the sub OS.

Process sequences 1-9 responsive to each of transitions between the four states of S101-S104 of the sub OS are described below. One of the process sequences 1 through 9 is performed when one of the event I201, namely, the interrupt for the main OS, and the event I202, namely, the interrupt for the sub OS takes place.

[Sequence 1]
The sequence 1 is performed in a state transition from
state S101: startup of the sub OS to
state S102: completion of initialization of the sub OS.
During this state transition, the sub OS notifies the main OS of an interrupt factor used by the sub OS. This step is performed as the notification step to the interrupt factor registration manager 514 of FIG. 5.

The interrupt factor registration manager 514 of the main OS examines the interrupt factor notified of by the sub OS, and registers the permitted interrupt factor as a sub OS interrupt factor.

[Sequence 2]
The sequence 2 is performed in response to the state transition from
step S102: completion of initialization of the sub OS to step S103: interrupt-disabled state of the sub OS.
During the transition, the sub OS notifies the main OS that the sub OS is in the interrupt-disabled state. This step is performed as the notification step to the sub OS interrupt manager 512 of FIG. 5.

Upon receiving the notification from the sub OS that the sub OS is in the interrupt-disabled state, the sub OS interrupt manager 512 of the main OS registers the interrupt-disabled state of the sub OS in the state status table listing the mask state (see FIG. 6). By controlling the interrupt mask register with the interrupt-disabled state set as being (0) and the interrupt-enabled state set as being (1), the sub OS interrupt manager 512 sets a (mask) state to indicate that the sub OS is in the interrupt-disabled state. If an interrupt request is input under this state, that interrupt request must wait.

[Sequence 3]
The sequence 3 is performed in response to a state transition from
state S102: completion of initialization of the sub OS to state S104: interrupt-enabled state of the sub OS.
During the state transition, the sub OS notifies the main OS that the sub OS is in the interrupt-enabled state. The step is performed as the notification step to the sub OS interrupt manager 512 of FIG. 5.

Upon receiving from the sub OS the notification that the sub OS is in the interrupt-enabled state, the sub OS interrupt manager 512 in the main OS registers the interrupt-enabled state of the sub OS in the status table listing the mask state (see FIG. 6). By controlling the interrupt mask register with the interrupt-disabled state set as being (0) and the interrupt-enabled state set as being (1), the sub OS interrupt manager 512 sets a (mask release) state to indicate that the sub OS is in the interrupt-enabled state. If an interrupt request is input under this state, that interrupt request is performed without waiting.

The main OS checks the status table for the presence of an interrupt currently reserved. The status table lists OS status information as to whether each OS is in the interrupt-enabled state or the interrupt-disabled state, and interrupt reserved state information. The interrupt reserve controller 519 of FIG. 5 writes the interrupt reserved state information onto the status table. If a reserved interrupt is present, the interrupt reserve controller 519 notifies the sub OS of the reserved interrupt.

[Sequence 4]
The sequence 4 is performed in response to a state transition from
state S104: sub OS interrupt-enabled state to
state S103: sub OS interrupt-disabled state.
During the state transition, the sub OS notifies the main OS that the sub OS is transitioned from the interrupt-enabled state to the interrupt-disabled state. This step is performed as the notification step to the sub OS interrupt manager 512 of FIG. 5.

Upon receiving from the sub OS the notification that the sub OS is transitioned from the interrupt-enabled state to the interrupt-disabled state, the sub OS interrupt manager 512 in the main OS updates the status table (see FIG. 6) listing the mask state, namely, changing state registration information of the sub OS from the interrupt-enabled state to the interrupt-disabled state. By controlling the interrupt mask register with the interrupt-disabled state set as being (0) and the interrupt-enabled state set as being (1), the sub OS interrupt manager 512 sets a (mask) state to indicate that the sub OS is in the interrupt-disabled state. If an interrupt request is input under this state, that interrupt request must wait.

[Sequence 5]
The sequence 5 is performed in response to a state transition from
state S103: sub OS interrupt-disabled state to
state S104: sub OS interrupt-enabled state.
During the state transition, the sub OS notifies the main OS that the sub OS is transitioned from the interrupt-disabled state to the interrupt-enabled state. This step is performed as the notification step to the sub OS interrupt manager 512 of FIG. 5.

Upon receiving from the sub OS the notification that the sub OS is transitioned from the interrupt-disabled state to the interrupt-enabled state, the sub OS interrupt manager 512 in the main OS updates the status table (see FIG. 6) listing the mask state, thereby changing the state registration information of the sub OS from the interrupt-disabled state to the interrupt-enabled state. By controlling the interrupt mask register with the interrupt-disabled state set as being (0) and the interrupt-enabled state set as being (1), the sub OS interrupt manager 512 sets a (mask released) state to indicate that the sub OS is in the interrupt-enabled state. If an interrupt request is input under this state, the interrupt process is performed.

[Sequence 6]

The sequence 6 is performed when the sub OS interrupt occurs as the event I202 in the sub OS interrupt-disabled state of S103. Upon detecting the event I202, namely, the occurrence of the sub OS interrupt, the main OS references the status table to determine whether the sub OS is in the interrupt-enabled state or the interrupt-disabled state. The sub OS is now in the interrupt-disabled state.

After verifying that the sub OS is in the interrupt-disabled state, the main OS registers the interrupt as reserved on the status table.

The interrupt process is not currently performed but reserved.

[Sequence 7]

The sequence 7 is performed when the sub OS interrupt occurs as the event I202 in the sub OS interrupt-enabled state of S104.

The process in the sequence 7 becomes different depending on whether the process of the processor is performed by the main OS or the sub OS.

(a) Main OS in Operation

The main OS detects the sub OS interrupt as the event I202 while performing the process using the processor. The main OS references the status table of the sub OS to determine whether the sub OS is in the interrupt-enabled state or the interrupt-disabled state. The sub OS is in the interrupt-enabled state (S104).

After verifying that the sub OS is in the interrupt-enabled state, the main OS examines the priority of the interrupt. The interrupt is prioritized with a high priority level or a low priority level. The interrupt process responsive to the high priority level and the low priority level is described below.

(a-1) Interrupt Process at High Priority Level

If the generated interrupt factor is at a high priority level, the following processes (1) through (7) are performed. In the following, [Main OS] represents a process performed by the main OS, and [Sub OS] represents a process performed by the sub OS.

(1)(Main OS) The main OS registers the generated interrupt, as being processed, as data of the sub OS responsive to the interrupt of the status table (FIG. 6).

(2) [Main OS] The main OS switches the application of the processor from the main OS to the sub OS. This switch step is performed as a step of the OS switch controller 517 of FIG. 5.

(3) [Main OS] The main OS delivers the interrupt to the sub OS. This process step is performed as a step of the interrupt deliverer 516 of FIG. 5.

(4) [Sub OS] The sub OS executes the interrupt process responsive to the interrupt.

(5) [Sub OS] Subsequent to the completion of the interrupt process, the sub OS notifies the main OS of the completion of the interrupt process. The interrupt process end notifier receives the end notice from the sub OS.

(6) [Main OS] The main OS deletes from the status table an entry corresponding to the interrupt process registered and completed.

(7) [Main OS] After verifying that no other high priority level interrupt is input, the main OS switches from the sub OS to the main OS. This process step is performed as a step of the OS switch controller 517 of FIG. 5.

With the above-described process steps, the sub OS interrupt process having the high priority level is performed with priority. The interrupt process at the low priority level is described below. If the generated interrupt factor is at a low priority level, the main OS registers the generated interrupt as reserved interrupt information of the sub OS corresponding to the interrupt in the status table (FIG. 6).

At this point of time, the generated interrupt is not executed but must wait.

(b) Sub OS in Operation

If the sub OS performs the process using the processor, the following process steps are performed. In the following, [Main OS] represents a process performed by the main OS, and [Sub OS] represents a process performed by the sub OS.

(1) [Main OS] Upon detecting the generation of a sub OS interrupt, the main OS references the status table of the sub OS to determine whether the sub OS is in the interrupt-enabled state or the interrupt-disabled state. In this case, the sub OS is in the interrupt-enabled state (S104).

(2) [Main OS] After verifying that the sub OS is in the interrupt-enabled state, the main OS registers the generated interrupt, as being processed, as data of the sub OS corresponding to the interrupt in the status table (FIG. 6).

(3) [Main OS] The main OS delivers the interrupt request to the sub OS. This process step is performed as a step of the interrupt deliverer 516 of FIG. 5.

(4) [Sub OS] The sub OS performs the interrupt process.

(5) [Sub OS] Upon completing the interrupt process, the sub OS notifies the main OS of the end of the interrupt process. The interrupt process end notifier 518 of FIG. 5 receives the end notice from the sub OS.

(6) [Main OS] The main OS deletes from the status table an entry corresponding to the interrupt process registered and completed.

The sub OS performs the interrupt process responsive to the generated interrupt using the processor. The sub OS, if in the interrupt-enabled state, performs the interrupt process without waiting.

In summary, the interrupt process is performed in the sequence 7, namely, when the sub OS interrupt occurs with the sub OS in the interrupt-enable state.

(A) If the main OS is in operation, (A-1) the interrupt process is performed in response to a high priority level interrupt, and (A-2) the interrupt process is reserved in response to a low priority level interrupt.

(B) If the sub OS is in operation, the interrupt process is performed regardless of the priority level of the interrupt.

[Sequence 8]

The sequence 8 is performed if the event I201 as the main OS interrupt takes place with the sub OS in the interrupt-disabled state of S103.

In this case as well, the sequence 8 becomes different depending on whether the process using the processor is performed by the main OS or the sub OS.

Main OS in Operation

If the main OS detects the event I201 as a main OS interrupt while the main OS performs a process using the processor, the generated interrupt is delivered to the main OS. The main OS performs the interrupt process.

(b) Sub OS in operation

If the main OS detects the event I201 as a main OS interrupt while the sub OS performs a process using the processor, the main OS examines the priority of the generated interrupt. The two priority levels of low and high are used herein. The interrupt processes responsive to a high priority level interrupt and a low priority level interrupt are separately described below.

(b-1) High Priority Level Interrupt

The following process steps (1) through (7) are performed if the interrupt factor is at a high priority level. In the following, [Main OS] represents a process performed by the main OS, and [Sub OS] represents a process performed by the sub OS.

(1) [Main OS] The main OS switches the processor applied process from the sub OS to the main OS. The switching step is executed as a step of the OS switch controller 517 of FIG. 5.

(2) [Main OS] The main OS performs the interrupt process.

(3) [Main OS] The main OS switches the processor applied process from the main OS to the sub OS. The switching step is executed as a step of the OS switch controller 517 of FIG. 5.

The main OS interrupt process responsive to the high priority level interrupt is thus performed. The main OS interrupt process responsive to the low priority interrupt is described below. If the generated interrupt is at a low priority level, the main OS registers, in the status table (FIG. 6), the generated interrupt as the reserved interrupt information of the main OS.

The generated interrupt is not executed at this point of time but must wait.

[Sequence 9]

The sequence 9 is performed if the event I201 as a main OS interrupt takes place with the sub OS in the interrupt-enabled state of S104.

This process is identical to the process at the above-referenced sequence 8. More specifically, if an interrupt intended for the main OS takes place, the same process is performed regardless of whether the sub OS is in the interrupt-enabled state or the interrupt-disabled state.

The processes performed in response to the main OS interrupt (sequences 8 and 9) are summarized as below.

(A) The interrupt process is performed regardless of the interrupt priority level if the interrupt occurs while the main OS is in operation.

(B) If an interrupt occurs while the sub OS is in operation, the interrupt process is (B-1) performed in response to the high priority level interrupt but (B-2) reserved in response to the low priority level interrupt.

FIG. 8 lists OSs executing the processor applied process (OSs in operation), the priority levels (high or low), interrupt destination OSs, and interrupt-enabled and disabled states of the interrupt destination OSs. As listed, 16 scenarios of state setting are possible.

In accordance with one embodiment of the present invention, the main OS stores and manages the status information (status table of FIG. 7) of all sub OSs as to whether each sub OS is in the interrupt-enabled state or the interrupt-disabled state.

Responses to the sub OS interrupt process and the main OS interrupt process are summarized as below.

[Response to the Sub OS Interrupt Process]

When an interrupt intended for the sub OS takes place, the main OS references the status table. If the sub OS is in the interrupt-disabled state, the main OS sets and registers, in the status table, the generated interrupt as being reserved (sequence 6).

If the sub OS is in the interrupt-enabled state, the interrupt reserve process or the interrupt process is performed as below depending on whether the OS executing the processor applied process is the main OS or the sub OS (sequence 7).

(A) If the main OS is in operation, the interrupt process is (A-1) executed in response to the high priority level interrupt but (A-2) reserved in response to the low priority level interrupt.

(B) If the sub OS is in operation, the interrupt process is executed regardless of the priority level of the interrupt.

[Response to the Main OS Interrupt Process]

When an interrupt intended for the main OS takes place, the interrupt reserve process or the interrupt process is performed as below depending on whether the OS executing the processor applied process is the main OS or the sub OS (sequences 8 and 9).

(A) If the main OS is in operation, the interrupt process is executed regardless of the priority level of the interrupt.

(B) If the sub OS is in operation, the interrupt process is (B-1) executed in response to the high priority level interrupt but (B-2) reserved in response to the low priority level interrupt.

The main OS controls execution of the interrupt process and the interrupt reserve process based on the status information of all sub OSs, namely, depending on whether each sub OS is in the interrupt-enabled state or the interrupt-disabled state, status information at the generation of the interrupt, namely, the priority level of the interrupt, and whether the generated interrupt is intended for the main OS or the sub OS.

In accordance with embodiments of the present invention, the right to mask interrupts is not handed over to the sub OS. The sub OS notifies the main OS whether the sub OS is in the interrupt-enabled state and the interrupt-disabled state. Based on the notification, the main OS controls the interrupt masking to the sub OS. This arrangement overcomes the inconvenience that the sub OS reserves a required interrupt process in accordance with the sub OS's own mask control. All interrupt processes are thus controlled by the main OS. Since the sub OS interrupt vector manager 513 in the main OS (see FIG. 5) manages the interrupt vector area of the sub OS, the interrupt vector is shared, unlike the case in which interrupt vector management is performed by individual OSs. As previously discussed, the interrupt vector is the table of the memory area defined by the interrupt factor. For example, the interrupt vector is composed of a start address of an interrupt process routine. A processor receiving an interrupt examines the address of an interrupt handler from the memory area, and jumps to the address to start the interrupt process. The interrupt vector is shared by the main OS and the sub OS, and the required memory area is thus reduced.

The present invention has been discussed with reference to the particular embodiments. It is obvious that those skilled in the art can make modifications and changes to the embodiments without departing from the scope of the present invention. The embodiments of the present invention have been disclosed for exemplary purposes only, and are not intended to limit the scope of the present invention. The scope of the present invention is determined solely by reference to the claims appended thereto.

The above-referenced series of steps can be performed by software, hardware, or a combination thereof. If the series of steps is performed by software, a program forming the software is installed from a recording medium or via a network onto a computer incorporated into a hardware structure or to a general-purpose computer performing a variety of processes, for example.

The program can be recorded beforehand onto one of a hard disk and a read-only memory (ROM) as a recording medium. The program can also be stored (recorded) on a removable recording media temporarily or permanently. The recording media includes a floppy disk, a compact disk read-only memory (CD-ROM), a magneto-optic (MO) disk, a digital versatile disk (DVD), a magnetic disk, a semiconductor memory, etc. Such a removable medium can be supplied in package software.

The program can be installed from the removable recording medium to the computer. The program can be transmitted in a wireless fashion to the computer from a download site. The program can also be transmitted in a wired fashion via a network such as one of a LAN (local area network) and the Internet. The program is then received by the computer and installed onto a recording medium such as a hard disk in the computer.

The process steps discussed in this specification are sequentially performed in the time series order as stated. Alternatively, the steps may be performed in parallel or separately. In this specification, the system refers to a logical system composed of a plurality of apparatuses, and the elements of each apparatus are not necessarily contained in the same casing.

INDUSTRIAL APPLICABILITY

In accordance with embodiments of the present invention, the main operating system (OS) executing the interrupt process is set in the system in which a plurality of OSs concurrently run. With the main OS performing the interrupt control process, the mask time of the entire system is reduced, interrupt response is improved, and data processing is efficiently performed.

In accordance with embodiments of the present invention, the main OS executing the interrupt process control is set, and the right to set an interrupt mask is not handed over to the sub OS other than the main OS. The sub OS notifies the main OS as to whether the sub OS is in the interrupt-enabled state or the interrupt-disabled state. The main OS controls an interrupt mask of the sub OS. This arrangement prevents the sub OS from reserving a required interrupt process due to its own mask control. In accordance with the intention of the main OS, all interrupt processes are controlled. Required interrupt processes are thus performed with priority.

In accordance with embodiments of the present invention, the sub OS interrupt vector management unit is set in the main OS. The main OS generally manages the interrupt vector area of the sub OS. Unlike interrupt vector management individually performed by OSs, the interrupt vector is shared, and memory area is reduced.

Figure 9:
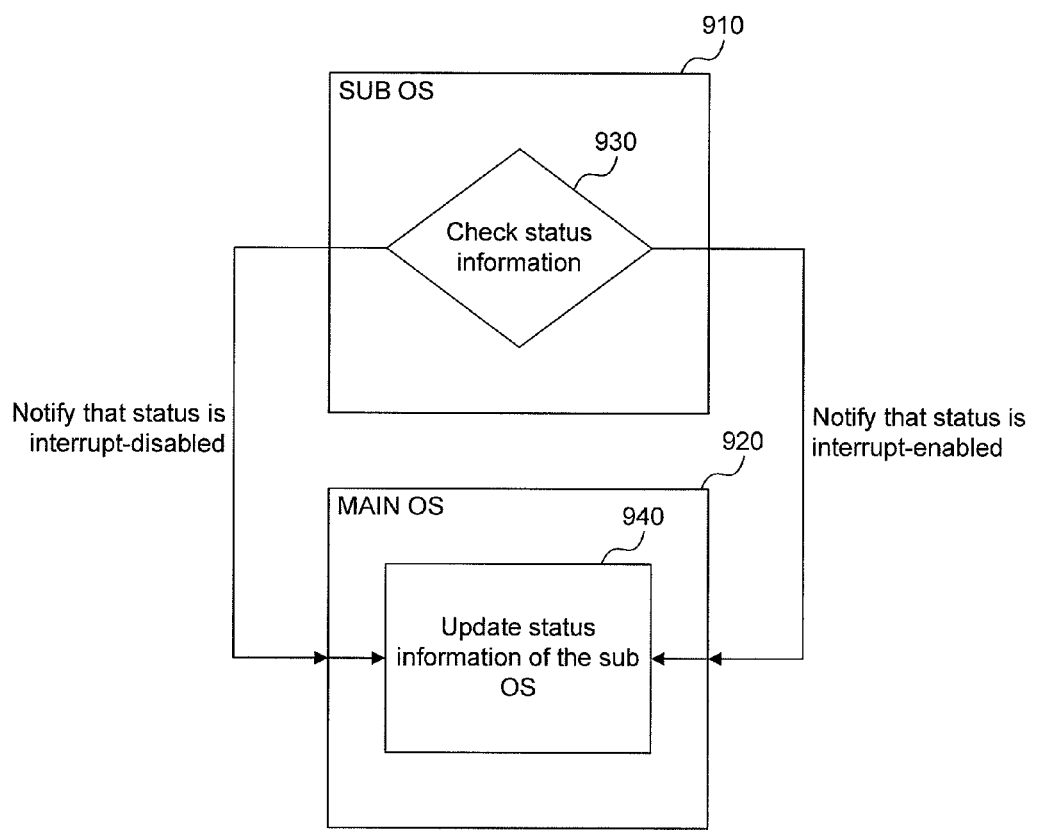
FIG. 9 illustrates a functional diagram depicting the notification of status information and the updating of status information according to an embodiment of the invention.

FIG. 9 illustrates the notification of status information and the updating of status information performed by an information processing apparatus according to an embodiment of the invention. A sub OS (910) checks status information in step 930, and notifies the main OS (920) on the status of the sub OS. For example, the main OS is notified as to whether the status information indicates an interrupt-enabled or interrupt-disabled state. Following the notification, the main OS updates the status information of the sub OS in step 940.

Figure 10:
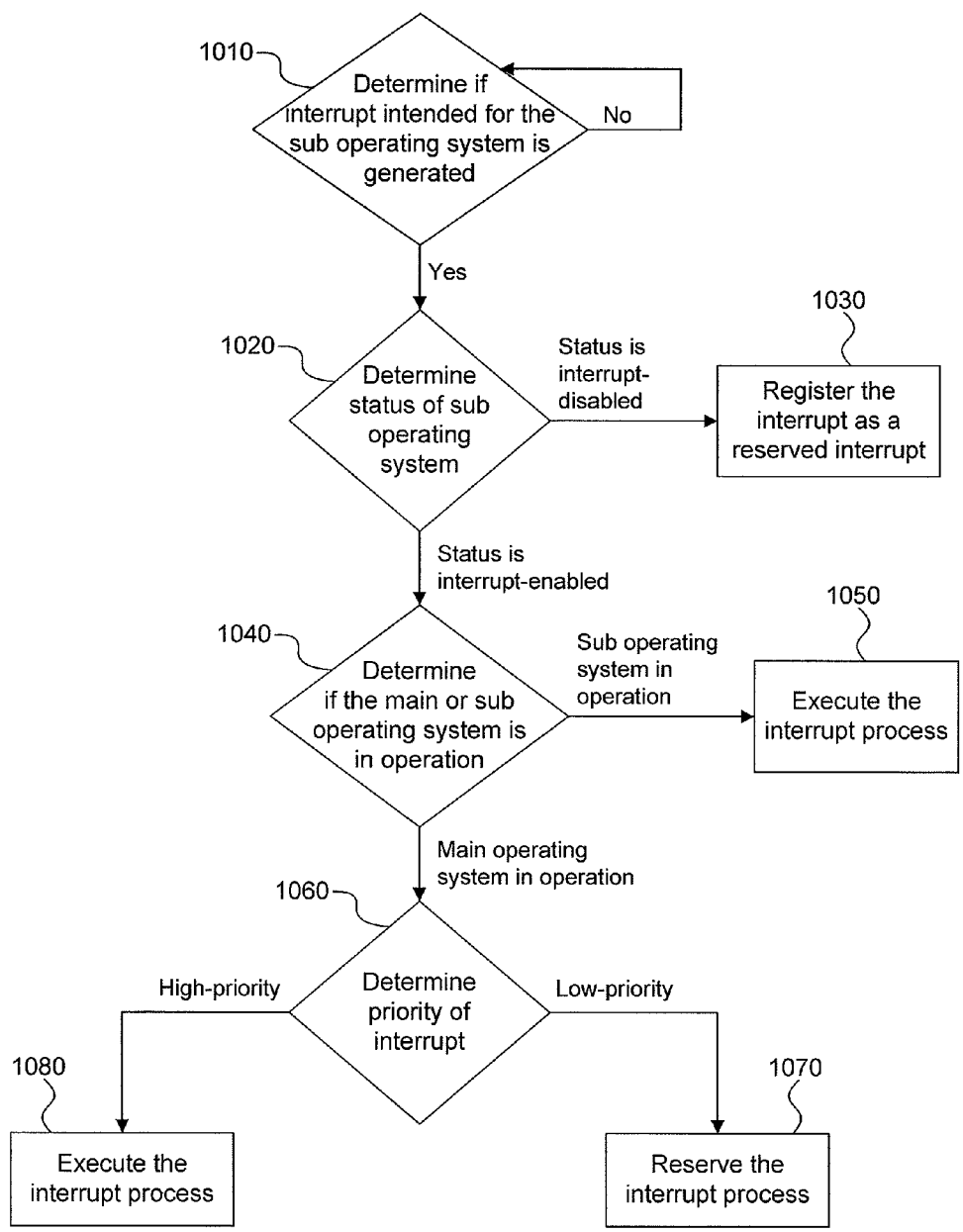
FIG. 10 illustrates a functional diagram that depicts interrupt process management based on status information of the sub operating system according to an embodiment of the invention.

FIG. 10 illustrates interrupt process management performed by an information processing apparatus according to an embodiment of the invention. In step 1010, a determination is made with regard to whether a generated interrupt is intended for a sub operating system. If the interrupt is intended for a sub operating system, then step 1020 is invoked, where the status of the sub operating system is determined. If the status of the sub operating system indicates an interrupt-disabled state, then the interrupt is registered as a reserved interrupt in step 1030. If the status of the sub operating system indicates an interrupt-enabled state, then step 1040 is invoked, where it is determined whether the main operating system or the sub operating system is in operation. If the sub operating system is in operation, then the interrupt process is executed in step 1050. If the main operating system is in operation, then step 1060 is invoked, where the priority of the interrupt is determined. If the interrupt is a high-priority interrupt, then the interrupt process is executed in step 1080. On the other hand, if the interrupt is a low-priority interrupt, then the interrupt process is reserved in step 1070.

Figure 11:
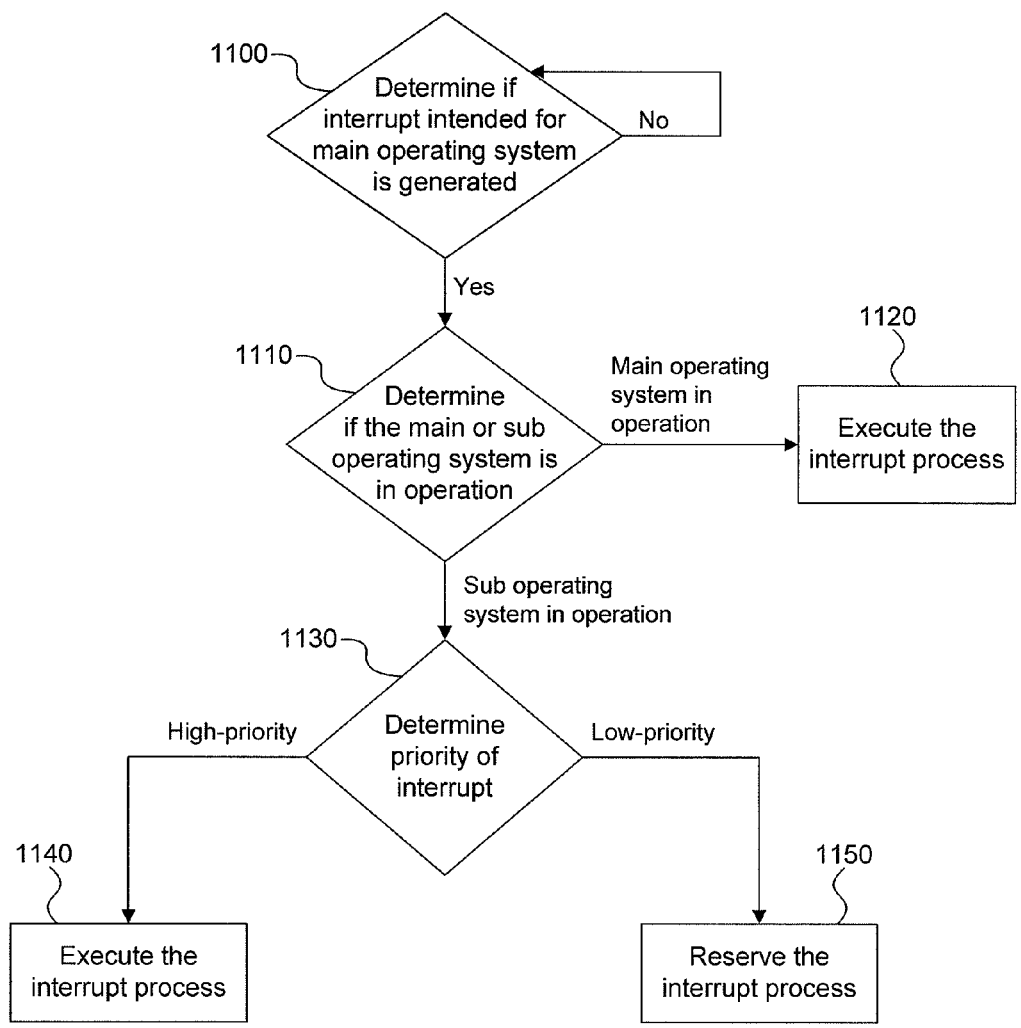
FIG. 11 illustrates a functional diagram that depicts interrupt process management based on the priority of an interrupt and the operational status of the main and sub operating systems, according to an embodiment of the invention.

FIG. 11 illustrates interrupt process management performed by an information processing apparatus according to an embodiment of the invention. In step 1100, a determination is made with regard to whether a generated interrupt is intended for the main operating system. If the generated interrupt is intended for the main operation system, then at step 1110, it is determined whether the main operating system or a sub operating system is in operation. If the main operating system is in operation, then the interrupt process is executed in step 1120. If the sub operating system is in operation, then the priority of the interrupt is determined in step 1130. If the interrupt is of a low priority, then the interrupt process is reserved in step 1150. If, on the other hand, the interrupt is of a high priority, the interrupt process is executed in step 1140.

What is claimed is:

1. An information processing apparatus for processing data, comprising a plurality of operating systems and a processor and memory, the plurality of operating systems including a main operating system controlling an interrupt process and a sub operating system, the main operating system, along with a system control operating system set as the sub operating system:
setting a logical partition as a process unit,
enforcing a customizable upper limit on the resources available to the logical partition that one or more guest sub operating systems can allocate or release without communicating with the system control operating system, and
managing a hardware resource relating to the logical partition;

the sub operating system:
operating within the logical partition set by the main operating system and the system control operating system, and
executing a software application program with the hardware resource assigned to the logical partition; and the main operating system:
storing, in the memory, status information as to whether the sub operating system is in an interrupt-enabled state or an interrupt-disabled state, and
controlling the interrupt process, based on the status information, to perform one of an interrupt process execution and an interrupt process reserve, in response to generation of the interrupt.

2. The information processing apparatus according to claim 1, wherein the main operating system stores interrupt process status information as to whether the interrupt process is in progress or in reserve, and resumes the interrupt process execution in response to the transition of the sub operating system between the interrupt-enabled state and the interrupt-disabled state.

3. The information processing apparatus according to claim 1, wherein the sub operating system notifies the main operating system of the status information as to whether the sub operating system is in the interrupt-enabled state or the interrupt-disabled state, and
   wherein the main operating system updates the status information of the sub operating system in response to the notification from the sub operating system.

4. The information processing apparatus according to claim 1, wherein the main operating system stores priority information of the interrupt process, and performs the interrupt process responsive to the priority information.

5. The information processing apparatus according to claim 1, wherein the main operating system performs status management based on a status table containing the status information of the sub operating system and the interrupt process status information as to whether the interrupt process is in progress or in reserve,
   if an interrupt intended for the sub operating system is generated and the main operating system determines based on the status table that the sub operating system is in the interrupt-disabled state, registers the interrupt in the status table as a reserved interrupt, and
   if an interrupt intended for the sub operating system is generated and the main operating system determines based on the status table that the sub operating system is in the interrupt-enabled state, performs interrupt control depending on whether the operating system operating on a processor is either the main operating system or the sub operating system in a manner such that:
   (a) if the main operating system is in operation, the main operating system
      (a1) executes the interrupt process in response to a high-priority interrupt, or
      (a2) reserves the interrupt process in response to a low-priority interrupt; and that
   (b) if the sub operating system is in operation, the main operating system executes the interrupt process regardless of the priority level of the interrupt.

6. The information processing apparatus according to claim 1, wherein the main operating system performs status management based on a status table containing the status information of the sub operating system and the interrupt process status information as to whether the interrupt process is in progress or in reserve, and
   if an interrupt intended for the main operating system is generated, performs interrupt control depending on whether the operating system operating on a processor is either the main operating system or the sub operating system in a manner such that
   (a) if the main operating system is in operation, the main operating system executes the interrupt process regardless of the priority level of the interrupt, and that
   (b) if the sub operating system is in operation, the main operating system
      (b1) executes the interrupt process in response to a high-priority interrupt, or
      (b2) reserves the interrupt process in response to a low-priority interrupt.

7. An interrupt process control method for performing data processing on a plurality of operating systems, the method comprising steps of:
   in a main operating system;
      controlling an interrupt process,
      managing a hardware resource to a logical partition, with the logical partition being handled as a process execution unit in the main operating system along with a system control operating system set as a sub operating system, and
      enforcing a customizable upper limit on the resources available to the logical partition that one or more guest sub operating systems can allocate or release without communicating with the system control operating system;
   in the sub operating system, executing a software application program, with the hardware resource assigned to the logical partition being used, within the logical partition set by the main operating system and the system control operating system;
   in the main operating system, receiving, from a sub operating system other than a main operating system, status information as to whether the sub operating system is in an interrupt-enabled state or an interrupt-disabled state;
   detecting the generation of an interrupt; and
   controlling an interrupt process, based on the status information, to perform one of an interrupt process execution and an interrupt process reserve, in response to the generation of the interrupt.

8. The interrupt process control method according to claim 7, wherein the main operating system stores interrupt process status information as to whether the interrupt process is in progress or in reserve, and resumes the interrupt process execution in response to the transition of the sub operating system between the interrupt-enabled state and the interrupt-disabled state.

9. The interrupt process control method according to claim 7, further comprising steps of:
   notifying the main operating system of the status information as to whether the sub operating system is in the interrupt-enabled state or the interrupt-disabled state, and
   updating the status information of the sub operating system in response to the notification from the sub operating system.

10. The interrupt process control method according to claim 7, wherein the main operating system stores priority information of the interrupt process, and performs the interrupt process responsive to the priority information.

11. The interrupt process control method according to claim 7, wherein the main operating system performs status management based on a status table containing the status information of the sub operating system and the interrupt process status information as to whether the interrupt process is in progress or in reserve,
   if an interrupt intended for the sub operating system is generated and the main operating system determines based on the status table that the sub operating system is in the interrupt-disabled state, registers the interrupt in the status table as a reserved interrupt, and
   if an interrupt intended for the sub operating system is generated and the main operating system determines based on the status table that the sub operating system is in the interrupt-enabled state, performs interrupt control depending on whether the operating system operating on a processor is either the main operating system or the sub operating system in a manner such that:
   (a) if the main operating system is in operation, the main operating system
      (a1) executes the interrupt process in response to a high-priority interrupt, or (a2) reserves the interrupt process in response to a low-priority interrupt; and that (b) if the sub operating system is in operation, the main operating system executes the interrupt process regardless of the priority level of the interrupt.

12. The interrupt process control method according to claim 7, wherein the main operating system performs status management based on a status table containing the status information of the sub operating system and the interrupt process status information as to whether the interrupt process is in progress or in reserve, and if an interrupt intended for the main operating system is generated, performs interrupt control depending on whether the operating system operating on a processor is either the main operating system or the sub operating system in a manner such that (a) if the main operating system is in operation, the main operating system executes the interrupt process regardless of the priority level of the interrupt, and that (b) if the sub operating system is in operation, the main operating system (b1) executes the interrupt process in response to a high-priority interrupt, or (b2) reserves the interrupt process in response to a low-priority interrupt.

13. A computer program, embodied in a non-transitory computer-readable medium, for performing data processing on a plurality of operating systems, the computer program, when executed on one or more processors, causing the one or more processors to perform steps comprising:

in a main operating system:
controlling an interrupt process,
managing a hardware resource to a logical partition, with the logical partition being handled as a process execution unit in the main operating system along with a system control operating system set as a sub operating system, and
enforcing a customizable upper limit on the resources available to the logical partition that one or more quest sub operating systems can allocate or release without communicating with the system control operating system;

in the sub operating system, executing a software application program, with the hardware resource assigned to the logical partition being used, within the logical partition set by the main operating system and the system control operating system;

in the main operating system, receiving, from a sub operating system other than an main operating system, status information as to whether the sub operating system is in an interrupt-enabled state or an interrupt-disabled state;

detecting the generation of an interrupt; and controlling an interrupt process, based on the status information, to perform one of an interrupt process execution and an interrupt process reserve, in response to the generation of the interrupt.

* * * * *